United States Patent
Atia et al.

(10) Patent No.: US 9,930,110 B2
(45) Date of Patent: Mar. 27, 2018

(54) DYNAMIC CLIENT-BASED LEADER ELECTION

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Ran Harel, Kfar-Saba (IL); Alon Marx, Matan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 15/058,567

(22) Filed: Mar. 2, 2016

(65) Prior Publication Data
US 2017/0257430 A1  Sep. 7, 2017

(51) Int. Cl.
*G06F 15/16* (2006.01)
*H04L 29/08* (2006.01)
*H04L 29/06* (2006.01)

(52) U.S. Cl.
CPC .... *H04L 67/1008* (2013.01); *H04L 29/08171* (2013.01); *H04L 29/08189* (2013.01); *H04L 29/08243* (2013.01); *H04L 67/101* (2013.01); *H04L 67/1025* (2013.01); *H04L 67/42* (2013.01)

(58) Field of Classification Search
CPC ...... H04L 29/08144–29/08297; H04L 47/125; H04L 67/1002–67/1038
See application file for complete search history.

(56) References Cited

U.S. PATENT DOCUMENTS 6,351,775 B1 *  2/2002  Yu .................... H04L 67/1008
                                            370/237
7,310,802 B2   12/2007  Dani et al.
(Continued)

FOREIGN PATENT DOCUMENTS

CN           102447624 B      9/2014

OTHER PUBLICATIONS

Samah A. Senbel, "Load-Balancing in a Self-organizing Server Cluster Using Local Leaders," Informatics and Systems (INFOS), 2010 7th Int. Conf., pp. 1-8, Mar. 28-30, 2010 (9 pages).

*Primary Examiner* — Brendan Higa
(74) *Attorney, Agent, or Firm* — Griffiths & Seaton PLLC

(57) ABSTRACT

A method, including deploying multiple servers as a distributed computing system (DCS) configured to provide a service to clients. At a first time, a given server is configured as an active node in the DCS, the active node configured to and to process requests for the service received from the clients. At the first time, one or more remaining first servers are configured as one or more semi-active nodes in the DCS, each given semi-active node configured to receive, from the clients, requests for the service, and to forward the received requests to the active node for processing. Each of the servers maintains respective counts of the received requests, and at a second time subsequent to the first time, upon identifying a given remaining server having a highest count the given remaining server is reconfigured as the active node, and the given server is reconfigured as a semi-active node.

20 Claims, 3 Drawing Sheets

(56) References Cited

U.S. PATENT DOCUMENTS

| | | | |
|---|---|---|---|
| 7,437,594 B1 * | 10/2008 | Mount | G06F 11/2035 709/224 |
| 7,480,705 B2 | 1/2009 | Delima et al. | |
| 7,548,945 B2 | 6/2009 | Asnis | |
| 7,739,384 B2 | 6/2010 | Siev et al. | |
| 9,047,246 B1 | 6/2015 | Rahut | |
| 2003/0009558 A1 * | 1/2003 | Ben-Yehezkel | G06F 9/505 709/225 |
| 2003/0014526 A1 * | 1/2003 | Pullara | H04L 29/06 709/227 |
| 2003/0101265 A1 * | 5/2003 | Dantzig | G06F 9/505 709/226 |
| 2005/0132154 A1 | 6/2005 | Rao et al. | |
| 2010/0211637 A1 * | 8/2010 | Borzsei | G06Q 50/01 709/204 |
| 2011/0078467 A1 * | 3/2011 | Hildebrand | G06F 1/3203 713/310 |
| 2011/0138037 A1 * | 6/2011 | Sharma | G06F 9/505 709/224 |
| 2013/0272253 A1 * | 10/2013 | Veenstra | H04W 72/0486 370/329 |
| 2015/0248337 A1 * | 9/2015 | Adler | G06F 11/2069 714/4.11 |

* cited by examiner

DYNAMIC CLIENT-BASED LEADER ELECTION

FIELD OF THE INVENTION

The present invention relates generally to distributed computing, and specifically to implementing dynamic client-based leader election with usage forecasting.

BACKGROUND

Distributed computing systems comprising multiple nodes (i.e., networked computers) typically use leader election algorithms to designate a single process as an organizer (i.e., "leader") of some task distributed among the nodes. Before starting to execute its respective task, a given node is either unaware which node will serve as the leader or unable to communicate with the current leader. After a leader election algorithm has been executed to elect a given node as a leader, each node in the distributed computing system can then identify the given node as the task leader. In operation, the nodes typically communicate with each other in order to decide (i.e., elect) which of them will become the next leader.

The description above is presented as a general overview of related art in this field and should not be construed as an admission that any of the information it contains constitutes prior art against the present patent application.

SUMMARY

There is provided, in accordance with an embodiment of the present invention a method, including deploying multiple server computers as a distributed computing system configured to provide a service to a plurality of client computers, configuring, at a first time, a given server computer as an active node in the distributed computing system, the active node configured to receive, from the client computers, requests for the service, and to process the received requests, configuring, at the first time, one or more remaining first server computers as one or more semi-active nodes in the distributed computing system, each given semi-active node configured to receive, from the client computers, requests for the service, and to forward the received requests to the active node for processing, maintaining, by each of the server computers, respective counts of the requests for the service received from the client computers, identifying, at a second time subsequent to the first time, a given remaining server computer having a highest count, and reconfiguring the given remaining server computer as the active node, and reconfiguring the given server computer as a semi-active node.

There is also provided, in accordance with an embodiment of the present invention a distributed computer system, including multiple server computers deployed as a distributed computing system configured to provide a service to a plurality of client computers and arranged to configure, at a first time, a given server computer as an active node in the distributed computing system, the active node configured to receive, from the client computers, requests for the service, and to process the received requests, to configure, at the first time, one or more remaining first server computers as one or more semi-active nodes in the distributed computing system, each given semi-active node configured to receive, from the client computers, requests for the service, and to forward the received requests to the active node for processing, to maintain, by each of the server computers, respective counts of the requests for the service received from the client computers, to identify, at a second time subsequent to the first time, a given remaining server computer having a highest count, and to reconfigure the given remaining server computer as the active node, and to reconfigure the given server computer as a semi-active node.

There is further provided, in accordance with an embodiment of the present invention a computer program product, the computer program product including a non-transitory computer readable storage medium having computer readable program code embodied therewith, the computer readable program code including computer readable program code configured to deploy multiple server computers as a distributed computing system arranged to provide a service to a plurality of client computers, computer readable program code arranged to configure, at a first time, a given server computer as an active node in the distributed computing system, the active node configured to receive, from the client computers, requests for the service, and to process the received requests, computer readable program code arranged to configure, at the first time, one or more remaining first server computer as one or more semi-active node in the distributed computing system, each given semi-active node configured to receive, from the client computers, requests for the service, and to forward the received requests to the active node for processing, computer readable program code configured to maintain, by each of the server computers, respective counts of the requests for the service received from the client computers, computer readable program code configured to identify, at a second time subsequent to the first time, a given remaining server computer having a highest count, and computer readable program code configured to reconfigure the given remaining server computer as the active node, and to reconfigure the given server computer as a semi-active node.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
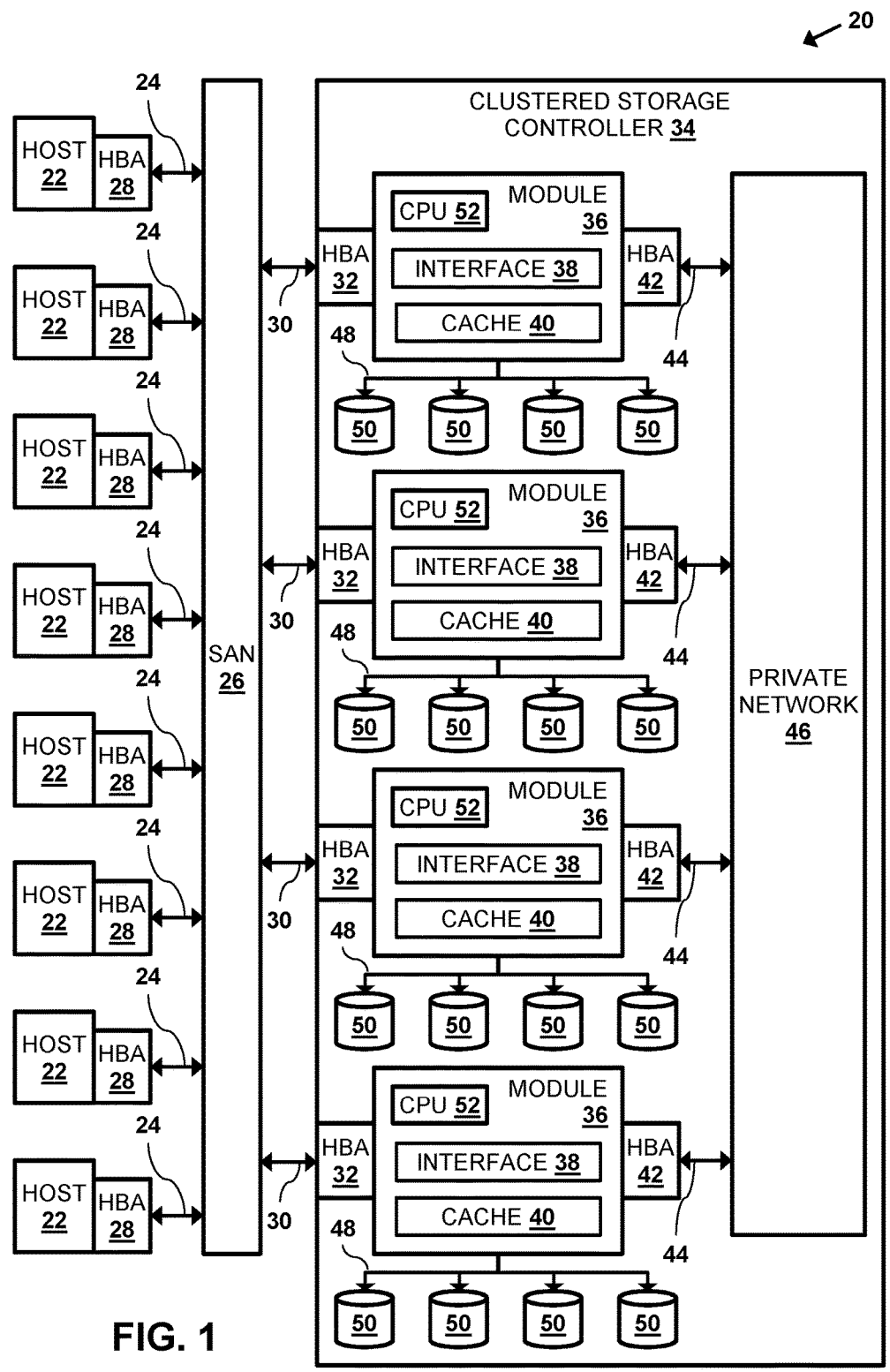
FIG. 1 is a block diagram that schematically illustrates a storage system comprising a storage controller, in accordance with an embodiment of the present invention.

Distributed computing systems may comprise multiple nodes configured to provide a service (e.g., a database service) to a plurality of client computers. While providing the service, each of the nodes can be configured as either an active node or a semi-active node that communicates with a respective subset of the client computers. In operation, the active node (also referred to herein as a "leader") receives a service request from a given client computer in its respective subset, processes the service request, and conveys a result of the service request back to the given client computer.

On the other hand, a given semi-active node is configured to receive a service request from a given client computer in its respective subset, and forward the service request to the active node. Upon receiving the forwarded service request, the active node processes the service request, and conveys a result of the service request to the given semi-active node. Upon receiving the result from the active node, the given semi-active node forwards the result to the given host computer.

Nodes (e.g., server computers) in distributed computing systems are typically configured to elect a leader. However, there may be instances when the nodes do not elect the optimal leader. In one example, three server instances A, B and C may elect server A as the leader when most clients accessing the distributed computing system have better access to server B. In another example, the servers may elect server A as the leader when the clients are no longer connected to server A. Instances when the nodes do not elect the optimal leader can negatively impact performance, since server B will receive most (or all) calls from the clients, and then redirect all the calls to server A instead of processing the calls locally.

Embodiments of the present invention provide methods and systems for analyzing client request data in order to elect a leader in a distributed computing system. As described hereinbelow, a distributed computing system, comprising multiple server computers configured to provide a service to a plurality of client computers, is deployed. At a first time, a given server computer is configured as an active node in the distributed computing system and one or more remaining first server computer are configured as one or more semi-active nodes in the distributed computing system, the active node configured to receive, from the client computers, requests for the service, and to process the received requests, each given semi-active node configured to receive, from the client computers, requests for the service, and to forward the received requests to the active node for processing.

While receiving and processing requests for the service (also referred to herein as service requests) from the client computers, respective counts of the requests for the service received from the client computers are maintained by each of the server computers. At a second time subsequent to the first time, a given remaining server computer having a highest count is identified, the given remaining server computer is reconfigured as the active node, and the given server computer is reconfigured as a semi-active node.

Systems implementing embodiments of the present invention can also detect time-based usage data, and use the trends to schedule election of a leader. For example, a global service may comprise a first server in a first location and a second server in a second location, the two locations having a ten hour time difference. Using time-based usage data, the first server can be scheduled to be configured as the leader during worktime hours in the first location, and the second server can be scheduled to be configured as the leader during worktime hours in the second location. Additionally, by dynamically electing the leader based on client requests (i.e., regardless of the time of day), the second server in the second location can be elected leader if client computers in the first location lose connectivity to the first server and are redirecting all their traffic to the second server.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
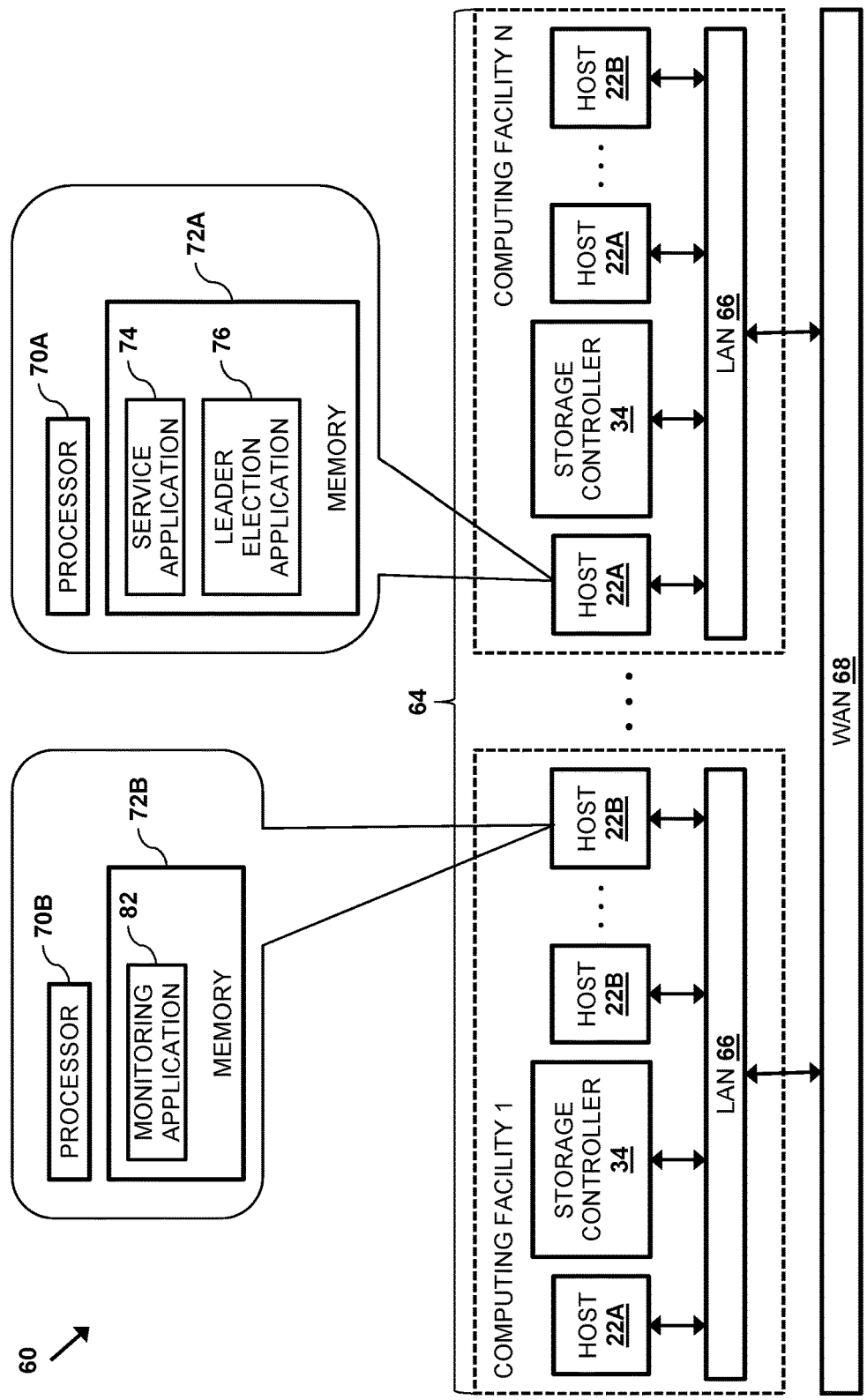
FIG. 2 is a block diagram that schematically illustrates a distributed computing system comprising multiple storage controllers configured to implement dynamic client-based leader election, in accordance with an embodiment of the present invention.

FIG. 2 is a block diagram that schematically illustrates a distributed computing system 60, in accordance with an embodiment of the present invention. In FIG. 2, host computers 22 and their respective components are differentiated by appending a letter to the identifying numeral, so that the host computers shown in FIG. 4 comprise host computers 22A and 22B. In embodiments described herein, storage controllers 34 and host computers 22A (also referred to herein as server computers) are configured to provide a service to multiple host computers 22B (also referred to herein as client computers).

Distributed computing system 60 comprises multiple computing facilities 64, each of the computing facilities comprising a given host computer 22A, a given storage controller 34 and one or more client computers 22B than communicate over a local area network (LAN) 66. Host computers 22A, storage controllers 34 and client computers 22B can communicate with one another via a wide area network (68) that couples the local area networks. In some embodiments, each computing facility 64 may comprise a separate physical location. For example, computing facilities 64 may be located in different cities.

In operation, each host computer 22A (also referred to herein as a server computer) stores and processes data on a given storage controller 34. While for purposes of simplicity, the example in FIG. 2 shows host computers 22A and 22B coupled via a given LAN 66 in a given computing facility 64, other configurations are considered to be within the spirits and scope of the present invention. For example, each computing facility 64 may be located in a different city, and each city may have client computers 22B in multiple offices (i.e., not in any computing facility 64) in communication with a given host computer 22A via an Internet connection. Additionally, while the example in FIG. 2 shows distributed computing system 60 configured to provide storage services to host computers 22A, configuring the distributed computing system to provide other types of services (e.g., email) is considered to be within the spirit and scope of the present invention.

Each host computer comprises a host processor 70A and a host memory 72A that stores a service application 74 and a leader election application 76. In operation, processors 70A execute separate instances of service application 74 (e.g., a database server) that comprises a distributed application that provides a service to client computers 22B. Processors 70A also execute leader election applications 76 that work together (i.e., as a distributed application) to periodically elect a given host computer 22A as the leader using embodiments described hereinbelow.

Each client computer 22B comprises a client processor 70B and a client memory 72B that stores a management application 82. In some embodiments, as described hereinbelow, processors 70B can execute management applications 82 to help manage the section of the leader in distributed computer system 69. In embodiments herein, the leader may be referred to as a given server computer (i.e., a given host computer) 22A configured as an active node in distributed computer system 60, and the remaining server computers may be referred to as non-active nodes in the distributed computer system.

Processors 52 and 70 comprise general-purpose central processing units (CPU) or special-purpose embedded processors, which are programmed in software or firmware to carry out the functions described herein. The software may be downloaded to modules 36 and host computers 22 in electronic form, over a network, for example, or it may be provided on non-transitory tangible media, such as optical, magnetic or electronic memory media. Alternatively, some or all of the functions of processors 52 and 70 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Dynamic Leader Election

Figure 3:
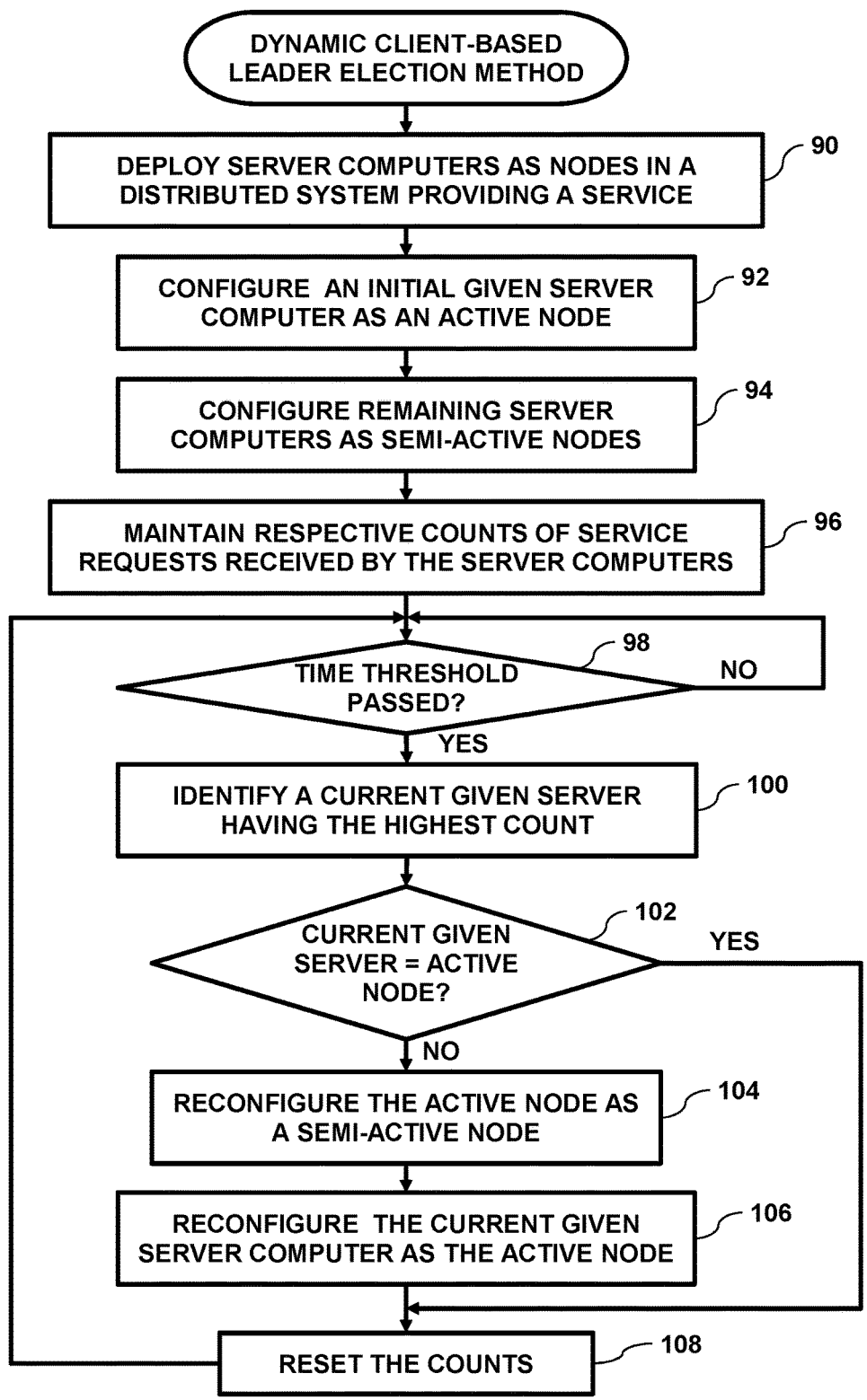
FIG. 3 is a flow diagram that schematically illustrates a method of dynamically electing a leader in the distributed computing system, in accordance with an embodiment of the preset invention.

FIG. 3 is a flow diagram that schematically illustrates a method of dynamically electing a leader for distributed computer system 60, in accordance with an embodiment of the present invention. In a deployment step 90, processors 70A execute respective instances of service application 74, thereby deploying host computers 22A as nodes in distributed computing system 60. In a first configuration step 92, distributed computer system 60 configures a given host computer 22A as an active node, and in a second configuration step 94, the distributed computer system configured remaining host computers 22A as semi-active nodes.

Upon configuring the active and the semi-active nodes, distributed computer system 60 starts receiving and processing service requests from client computers 22B. While receiving and processing the service requests, processors 70A start a timer and maintain respective counts of the service requests that they receive in a maintain step 96.

While receiving and processing the service requests, in a first comparison step 98, distributed computer system 60 waits until a specified time period passes. Upon the time period (e.g., 30 minutes) passing, in an identification step 100, distributed computer system 60 identifies a current given host computer 22A that has the highest count (i.e., the host computer that processed the most service requests from client computers 22B).

In a second comparison step 102, if the identified host computer having the highest count is not the same as the host computer currently configured as an active node, then distributed computer system 60 reconfigures the host computer currently configured as an active node to be an semi-active node in a first reconfiguration step 104, and reconfigures the identified host computer to be an active node in a second reconfiguration step 106. Finally, in a reset step 108, processors 70A reset their respective counts, resets the timer, and the method continues with step 98.

Returning to step 102, if the identified host computer having the highest count is the same host computer 22A as the host computer currently configured as an active node, then the method continues with step 108.

As described supra, distributed computer system 60, using a specified time period, periodically analyzes the number of requests received by each of its nodes in order to determine which host computer(s) 22A are to be elected as an active (i.e., leader) node. In some embodiments, distributed computer system 60 can use a short time threshold (e.g., 10 minutes) to analyze the number of requests received by each host computer 22A, but only allow election of a new active node after a long time period (e.g., 30 minutes). Performing the election after the long time period can help prevent "back-and-forth" reconfiguration of the active and the semi-active nodes. Additionally, using the short time threshold can help detect periodic request spikes that may not require reconfiguration of the active and the semi-active nodes.

In operation, distributed computer system 60 may detect repeating time periods when the distributed computer system 60 deploys a given host computer 22A as an active node. For example, if distributed computer system 60 comprises computing facilities 64 in two separate locations having a ten hour time difference, and the distributed computer system detects that a given host computer is reconfigured as an active node every weekday at 9:00 AM local time (i.e., the start of working hours), the distributed computer system can schedule the reconfiguration of the given node prior to 9:00 AM in order optimize operation of the distributed computer system.

While the embodiments described hereinabove analyze server requests received by host computers 22A in order to elect a given host computer 22A as an active node, alternative embodiments that utilize data traffic processed by the host computers to elect the active node are considered to be within the spirit and scope of the present invention.

In a first alternative embodiment, the distributed computing system comprises two nodes, a first host computer 22A configured as an active node and a second host computer 22A configured as a semi-active node. If the second host computer detects a loss of connectivity with the first host computer, the second host computer can identify one or more client computers 22B in communication with the second host computer, and convey, to the identified one or more identified client computers, a notification indicating the loss of connectivity. In response to receiving the notification indicating the loss of connectivity, a given client computer 22B can deactivate the first host computer from the distributed computing system, and activate the second host computer as an active node in the distributed computing system.

In a second alternative embodiment, the distributed computing system comprises more than two nodes, a first host computer 22A configured as an active node and two or more second host computers 22A configured as semi-active nodes. If a given second host computer 22A, detects a loss of connectivity with the first host computer, distributed computing system 60 can identify one of the second host computers that has the highest count, and reconfiguring the identified second server computer as an active node.

In a third alternative embodiment, the distributed computing system comprises two nodes, a first host computer 22A configured as an active node and a second host computer 22A configured as a semi-active node. If the first host computer detects a loss of connectivity with the second host computer, the first host computer can identify one or more of the client computers in communication with the first host computer, and convey, to the one or more identified client computers, a notification indicating a loss of high availability (i.e., since there is only one host computer 22A receiving and processing service requests)

In a fourth alternative embodiment, the distributed computing system comprises more than two nodes, a first host computer 22A configured as an active node and two or more second host computers 22A configured as semi-active nodes. If the first host computer detects a loss of connectivity with a given second server computer, the first host computer can identify, among a set of host computers 22A comprising the first server computer and one or more remaining second host computers 22A having connectivity to the first host computer, a given host computer 22A in the set that has the highest count, and upon the identified host computer in the set not matching the first host computer, the distributed computing system can reconfigure the identified host computer as an active node and reconfigure the first host computer as an semi-active node.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    deploying multiple server computers as a distributed computing system configured to provide a service to a plurality of client computers;
    configuring, at a first time, a given server computer as an active node in the distributed computing system, the active node configured to receive, from the client computers, requests for the service, and to process the received requests;
    configuring, at the first time, one or more remaining first server computers as one or more semi-active nodes in the distributed computing system, each given semi-active node configured to receive, from the client computers, requests for the service, and to forward the received requests to the active node for processing;

maintaining, by each of the server computers, respective counts of the requests for the service received from the client computers;

identifying, at a second time subsequent to the first time, a given remaining server computer having a highest count; and reconfiguring the given remaining server computer as the active node, and reconfiguring the given server computer as a semi-active node.

2. The method according to claim 1, and comprising detecting repeating times when one of the server computers is reconfigured as the active node, and scheduling, based on the repeating times, a future time to reconfigure the one of the server computers as the active node.

3. The method according to claim 1, wherein the distributed computing system comprises a first server computer configured as the active node and a second server computer configured as a semi-active node, and comprising detecting, by the second server computer, a loss of connectivity with the first server computer, identifying one or more of the client computers in communication with the second server computer, and conveying, by the second server computer to the one or more identified client computers, a notification indicating the loss of connectivity.

4. The method according to claim 3, and comprising receiving, by a given client computer, the notification indicating the loss of connectivity, and in response to receiving the notification, deactivating the first server computer from the distributed computing system, and activating the second given server computer as the active node in the distributed computing system.

5. The method according to claim 1, wherein the distributed computing system comprises a first server computer configured as the active node and two or more second server computers configured as semi-active nodes, and comprising upon detecting, by a given second server computer, a loss of connectivity with the first server computer, identifying, by the distributed computing system, one of the second server computers that has the highest count, and reconfiguring the identified second server computers as the active node.

6. The method according to claim 1, wherein the distributed computing system comprises a first server computer configured as the active node and a second server computer configured as a semi-active node, and comprising upon detecting, by the first server computer, a loss of connectivity with the second server computer, identifying one or more of the client computers in communication with the first server computer, and conveying, by the first server computer to the one or more identified client computers, a notification indicating a loss of high availability.

7. The method according to claim 1, wherein the distributed computing system comprises a first server computer configured as the active node and two or more second server computers configured as one or more semi-active nodes, and comprising detecting, by a the first server computer, a loss of connectivity with a given second server computer, identifying, among a set of server computers comprising the first server computer and one or more remaining second server computers having connectivity to the first server computer, a given server computer in the set having the highest count, and upon the given identified server computer identified in the set not matching the first server computer, reconfiguring the given server computer in the set as the active node and reconfiguring the first server computer as a semi-active node.

8. A distributed computer system, comprising:

multiple server computers deployed as a distributed computing system configured to provide a service to a plurality of client computers and arranged:

to configure, at a first time, a given server computer as an active node in the distributed computing system, the active node configured to receive, from the client computers, requests for the service, and to process the received requests, to configure, at the first time, one or more remaining first server computers as one or more semi- active nodes in the distributed computing system, each given semi-active node configured to receive, from the client computers, requests for the service, and to forward the received requests to the active node for processing, to maintain, by each of the server computers, respective counts of the requests for the service received from the client computers, to identify, at a second time subsequent to the first time, a given remaining server computer having a highest count, and to reconfigure the given remaining server computer as the active node, and to reconfigure the given server computer as a semi-active node.

9. The distributed computer system according to claim 8, wherein the multiple server computers are configured to detect repeating times when one of the server computers is reconfigured as the active node, and to schedule, based on the repeating times, a future time to reconfigure the one of the server computers the an active node.

10. The distributed computer system according to claim 8, wherein the distributed computing system comprises a first server computer configured as the active node and a second server computer configured as a semi-active node, and wherein the second server computer is configured to detect a loss of connectivity with the first server computer, to identify one or more of the client computers in communication with the second server computer, and to convey to the one or more identified client computers, a notification indicating the loss of connectivity.

11. The distributed computer system according to claim 10, wherein a given client computer is configured to receive the notification indicating the loss of connectivity, and in response to receiving the notification, to deactivate the first server computer from the distributed computing system, and to activate the second given server computer as the active node in the distributed computing system.

12. The distributed computer system according to claim 8, wherein the distributed computing system comprises a first server computer configured as the active node and two or more second server computers configured as semi-active nodes, and wherein upon a given second server computer detecting a loss of connectivity with the first server computer, the distributed computing system is configured to identify, a one of the second server computers having the highest count, and to reconfigure the identified second server computer as the active node.

13. The distributed computer system according to claim 8, wherein the distributed computing system comprises a first server computer configured as the active node and a second server computer configured as a semi-active node, and wherein upon detecting a loss of connectivity with the second server computer, the first server computer is configured to identify one or more of the client computers in communication with the first server computer, and to convey, to the one or more identified client computers, a notification indicating a loss of high availability.

14. The distributed computer system according to claim 8, wherein the distributed computing system comprises a first server computer configured as the active node and two or more second server computers configured as one or more semi-active nodes, and wherein the first server computer is configured to detect a loss of connectivity with a given second server computer, to identifying, among a set of server computers comprising the first server computer and one or more remaining second server computers having connectivity to the first server computer, a given server computer in the set having the highest count, and upon the given server computer identified in the set not matching the first server computer, to reconfigure the given server computer in the set as the active node and to reconfigure the first server computer as a semi-active node.

15. A computer program product, the computer program product comprising:
- a non-transitory computer readable storage medium having computer readable program code embodied therewith, the computer readable program code comprising:
- computer readable program code configured to deploy multiple server computers as a distributed computing system arranged to provide a service to a plurality of client computers;
- computer readable program code arranged to configure, at a first time, a given server computer as an active node in the distributed computing system, the active node configured to receive, from the client computers, requests for the service, and to process the received requests;
- computer readable program code arranged to configure, at the first time, one or more remaining first server computer as one or more semi-active node in the distributed computing system, each given semi-active node configured to receive, from the client computers, requests for the service, and to forward the received requests to the active node for processing;
- computer readable program code configured to maintain, by each of the server computers, respective counts of the requests for the service received from the client computers;
- computer readable program code configured to identify, at a second time subsequent to the first time, a given remaining server computer having a highest count; and
- computer readable program code configured to reconfigure the given remaining server computer as the active node, and to reconfigure the given server computer as a semi-active node.

16. The computer program product according to claim 15, wherein the distributed computing system comprises a first server computer configured as the active node and a second server computer configured as a semi-active node, and comprising computer readable program code configured to detect, by the second server computer, a loss of connectivity with the first server computer, to identify one or more of the client computers in communication with the second server computer, and to convey, by the second server computer to the one or more identified client computers, a notification indicating the loss of connectivity.

17. The computer program product according to claim 16, and comprising receiving, by a given client computer, the notification indicating the loss of connectivity, and in response to receiving the notification, deactivating the first server computer from the distributed computing system, and activating the second given server computer as the active node in the distributed computing system.

18. The computer program product according to claim 15, wherein the distributed computing system comprises a first server computer configured as the active node and two or more second server computers configured as semi-active nodes, and comprising computer readable program code configured, upon detecting, by a given second server computer, a loss of connectivity with the first server computer, to identify one of the second server computers having the highest count, and to reconfigure the identified second server computer as the active node.

19. The computer program product according to claim 15, wherein the distributed computing system comprises a first server computer configured as the active node and a second server computer configured as a semi-active node, and comprising computer readable program code configured, upon detecting, by the first server computer, a loss of connectivity with the second server computer, to identify one or more of the client computers in communication with the first server computer, and to convey, by the first server computer to the one or more identified client computers, a notification indicating a loss of high availability.

20. The computer program product according to claim 15, wherein the distributed computing system comprises a first server computer configured as the active node and two or more second server computers configured as one or more semi-active nodes, and comprising computer readable program code configured to detect, by a the first server computer, a loss of connectivity with a given second server computer, to identify, among a set of server computers comprising the first server computer and one or more remaining second server computers having connectivity to the first server computer, a given server computer in the set having the highest count, and upon the given server computer identified in the set not matching the first server computer, to reconfigure the given server computer in the set as the active node and to reconfigure the first server computer as a semi-active node.

* * * * *